(12) United States Patent
Crocker

(10) Patent No.: US 6,914,420 B2
(45) Date of Patent: Jul. 5, 2005

(54) POWER CONVERTER AND METHOD FOR POWER CONVERSION

(75) Inventor: Timothy Richard Crocker, Exeter (GB)

(73) Assignee: 3D Instruments Limited

( * ) Notice: Subject to any disclaimer, the term of this patent is extended or adjusted under 35 U.S.C. 154(b) by 0 days.

(21) Appl. No.: 10/480,060

(22) PCT Filed: May 28, 2002

(86) PCT No.: PCT/GB02/02472

§ 371 (c)(1),
(2), (4) Date: Jun. 8, 2004

(87) PCT Pub. No.: WO02/101909

PCT Pub. Date: Dec. 19, 2002

(65) Prior Publication Data

US 2004/0212357 A1 Oct. 28, 2004

(30) Foreign Application Priority Data

Jun. 9, 2001 (GB) .............................. 0114122

(51) Int. Cl.⁷ ............................................. G05F 1/44
(52) U.S. Cl. ............................................ 323/282
(58) Field of Search ........................ 323/239, 282, 323/324; 363/59, 60, 62

(56) References Cited

U.S. PATENT DOCUMENTS

| 4,354,223 | A | 10/1982 | Turnbull |
| 5,345,376 | A | 9/1994 | Nourbakhsh |
| 5,734,258 | A | 3/1998 | Esser |
| 6,002,603 | A | 12/1999 | Carver |
| 6,067,237 | A | * 5/2000 | Nguyen ...................... 363/17 |
| 6,118,678 | A | * 9/2000 | Limpaecher et al. .......... 363/60 |
| 6,232,752 | B1 | 5/2001 | Bissell |

OTHER PUBLICATIONS

Cáceres, R., et al., "Robust PID Control of a Buck–Boost DC—AC Converter", *Telecommunications Energy Conference, 2000 Intelec.*, pp. 180–185, Sep. 10–14, 2000.

* cited by examiner

*Primary Examiner*—Adolf Berhane
(74) *Attorney, Agent, or Firm*—Fish & Richardson P.C.

(57) ABSTRACT

A power converter for controlling power flow between first and second voltages has the following structure. A common connection links a first polarity of the first and second voltages, and a first electrode of a capacitance is coupled to the common connection. First and second switches are connected in series between the common connection and the second electrode of the capacitance, and the second polarity of the first voltage is coupled through a first inductance to the connection between the first and second switches. Third and fourth switches are also connected in series between the common connection and the second electrode if the capacitance, but the second polarity of the second voltage is coupled through a second polarity of the second voltage is coupled through a second inductance to the connection between the third and fourth switches. A controller controls the operation of all the switches in order to control the power flow between the first and second voltages. The circuit can be controlled in a variety of ways. For example, if the first switch is opened and the second closed while the third and fourth switches operate alternately, the second voltage is less than the first voltage. In general, however, controlling the alternating switching of the first and second or the third and fourth switches determines the ratio between the first and second voltages.

11 Claims, 10 Drawing Sheets

GENERIC CIRCUIT OF 'SPLIT-PI' TOPOLOGY

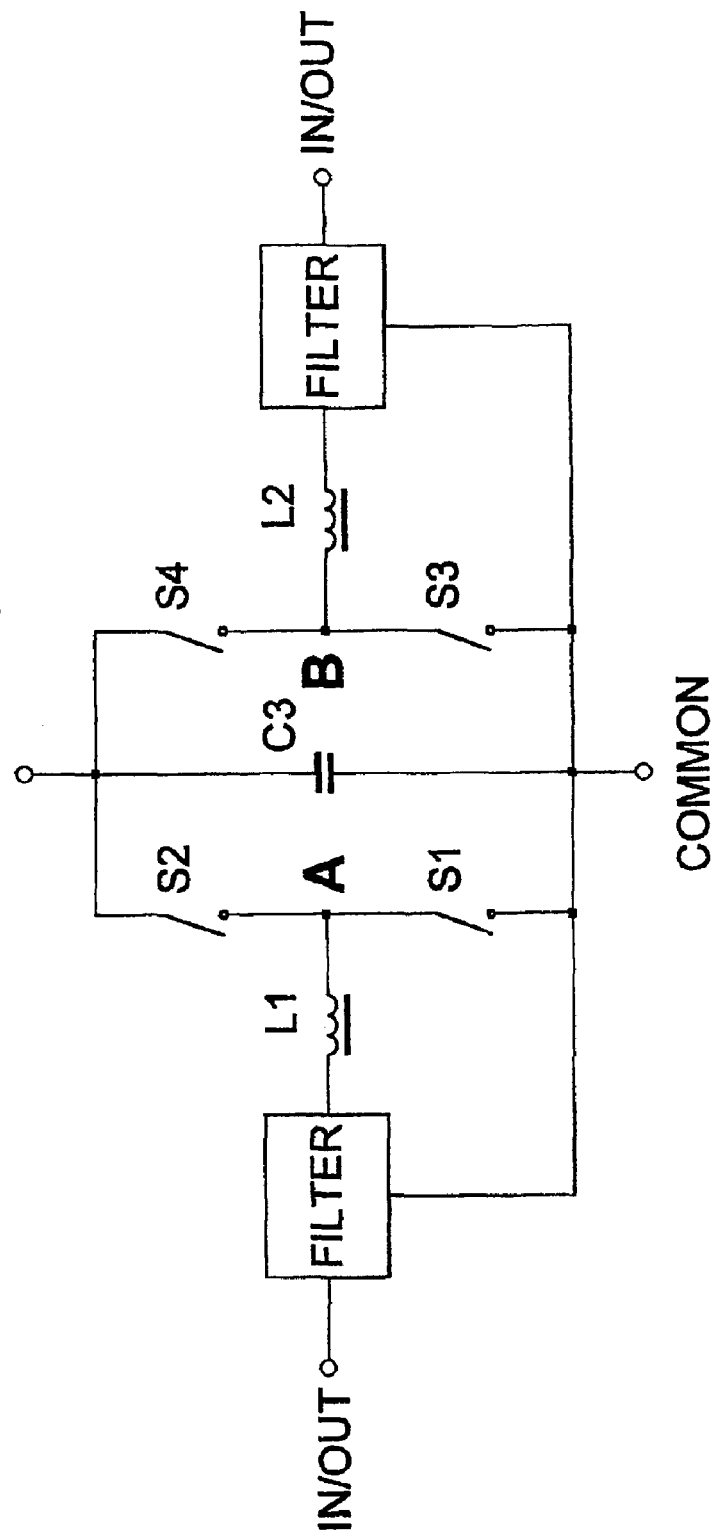
FIG 1    GENERIC CIRCUIT OF 'SPLIT-PI' TOPOLOGY

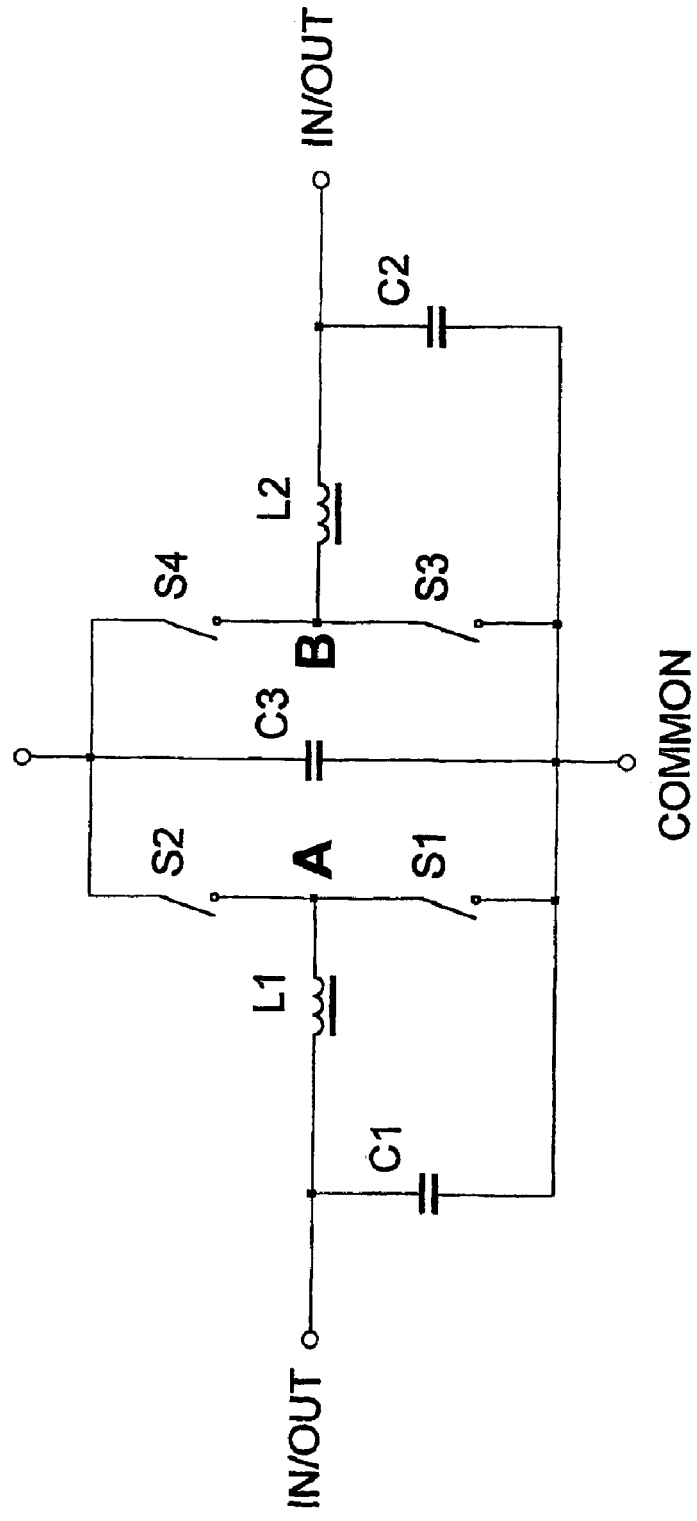
FIG 2  GENERIC CIRCUIT WITH CAPACITOR FILTERS

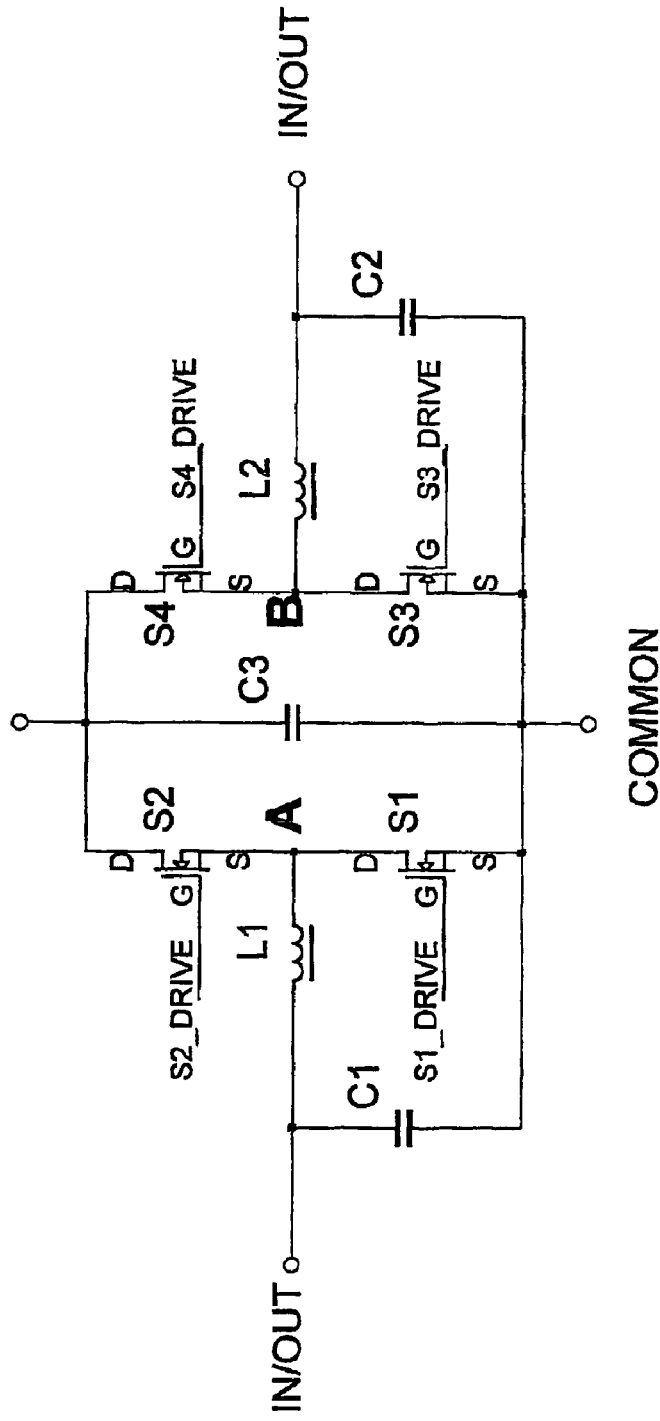
FIG 3  CAPACITOR FILTER CIRCUIT WITH N CHANNEL MOSFET SWITCHES

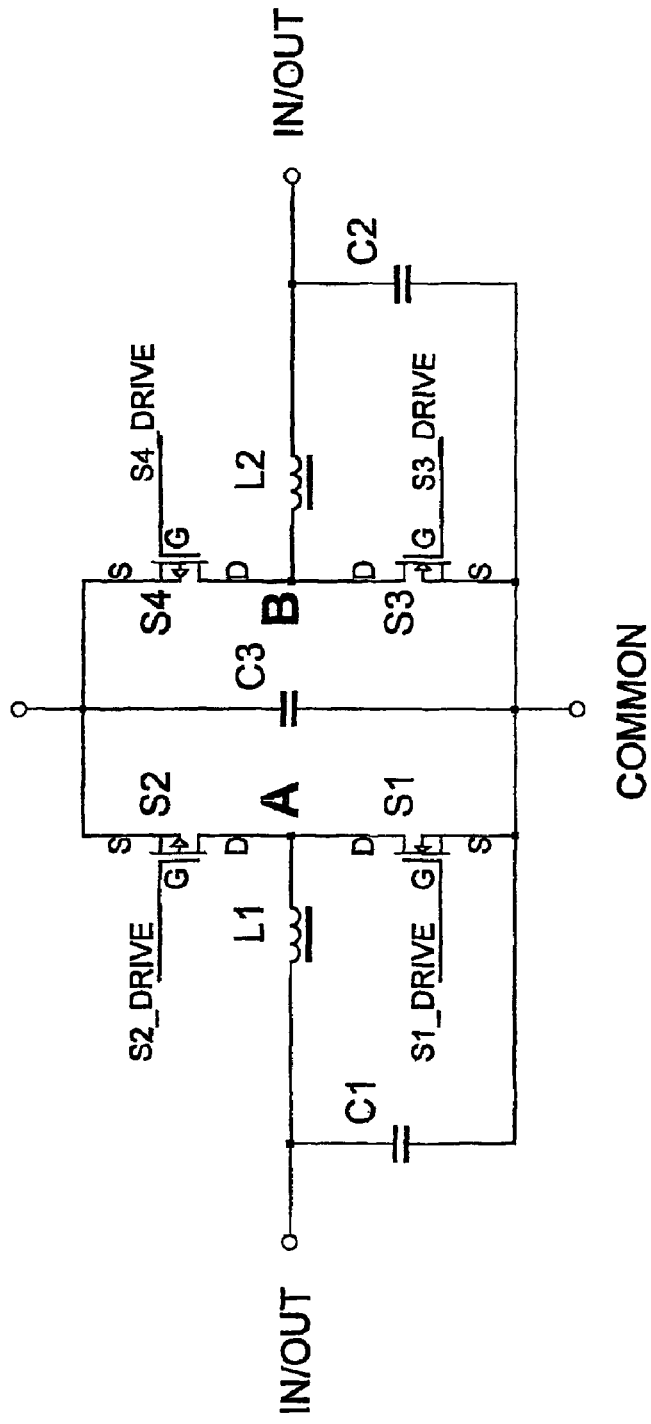
FIG 4    CAPACITOR FILTER CIRCUIT WITH MIXED MOSFET SWITCHES

FIG 5 Basic voltage waveforms
Control signals to switches
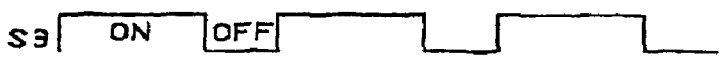
Voltage at point B
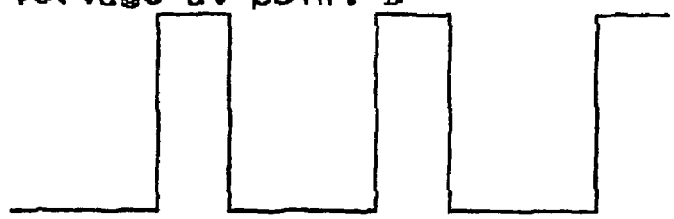
Fig 5a No load current
Fig 5b Light load current
Fig 5c Heavier load current
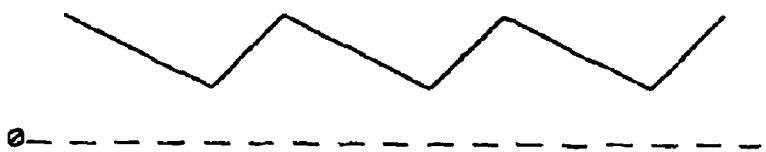
Fig 5d Light regenerative current
Fig 5e Heavier regenerative current

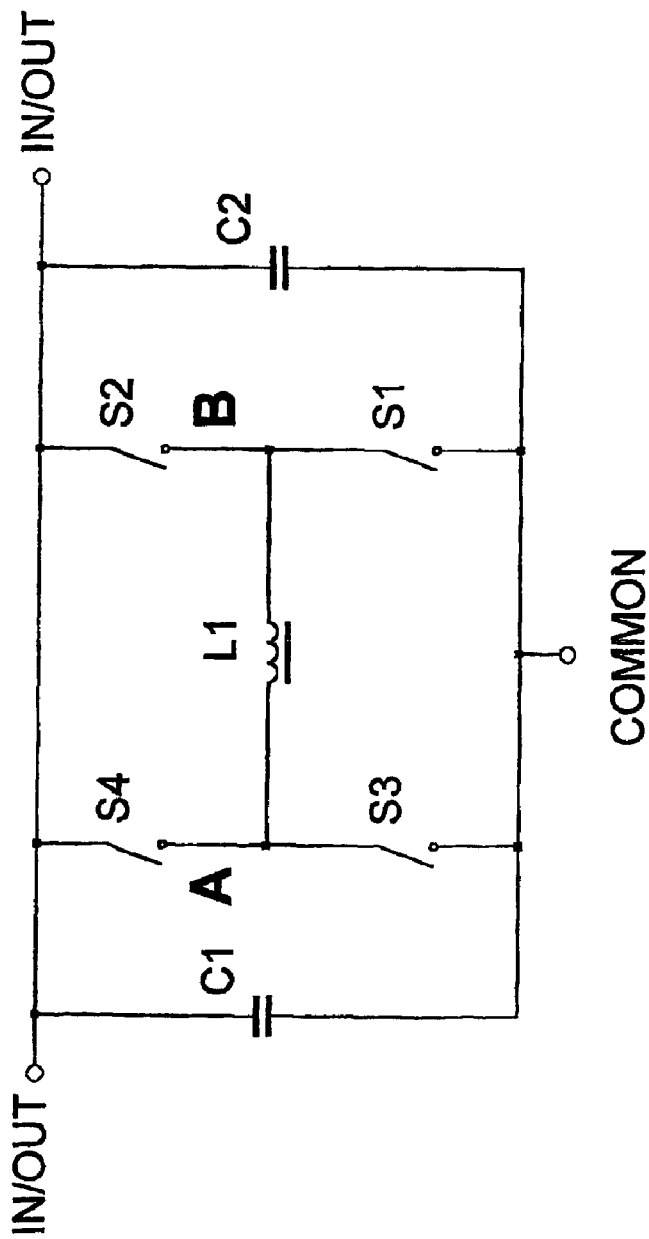
FIG 6    NEAREST KNOWN PRIOR TOPOLOGY AFTER 'ESSER'

FIG 7 Practical signals for circicuit of Fig 3
Control signals to switches with exagerated delays
Fig 8a Voltage at B and current in L2 for no load
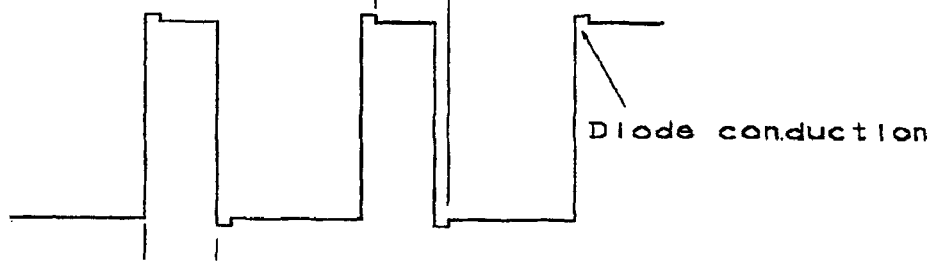
Fig 8b Voltage at B and current in L2 for heavy load

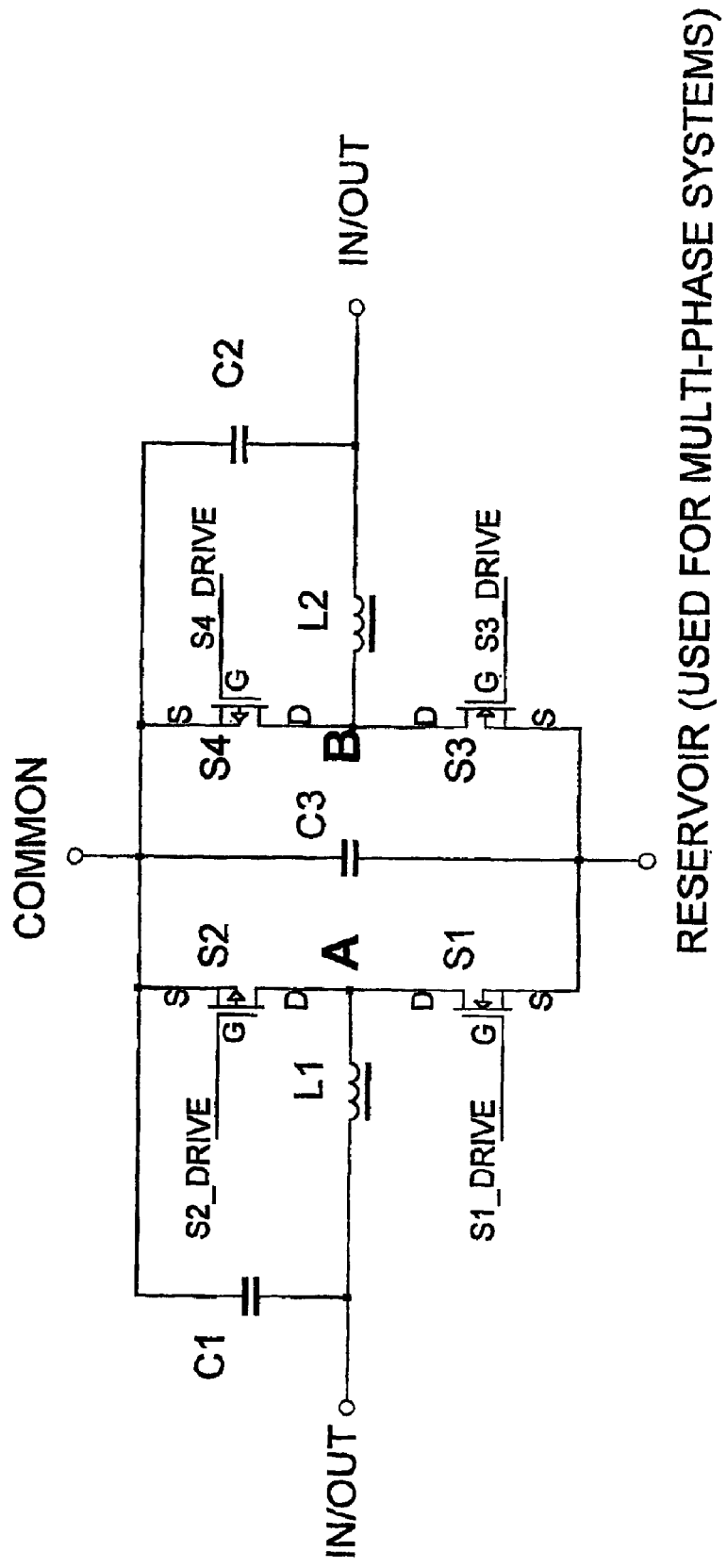
FIG 9   NEGATIVE POLARITY VERSION OF FIG 4

3 PHASE CONVERTER WITH 3 ELEMENTS DERIVING FROM FIG. 1
EXTENSION TO MORE PHASES IS SHOWN
CONTROL SIGNALS NOT SHOWN

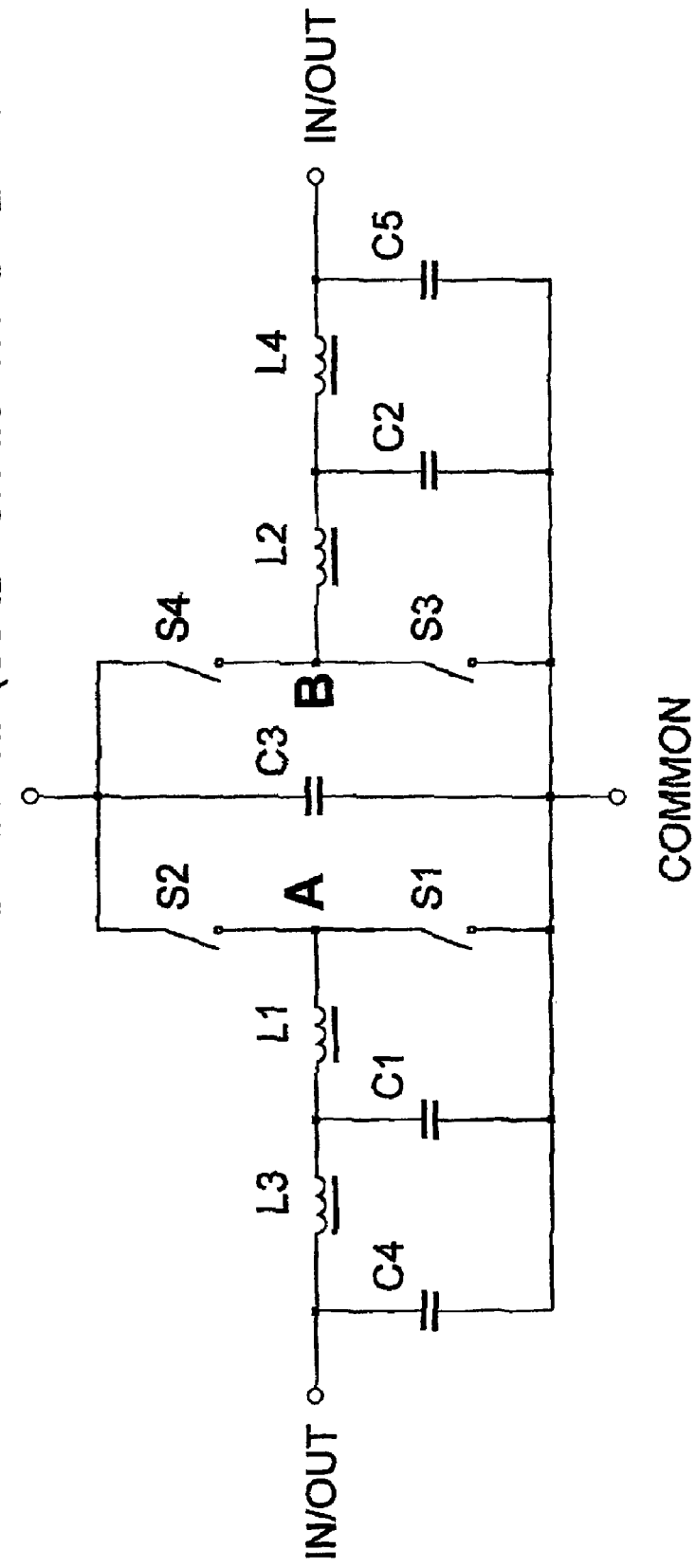
FIG 11 GENERIC CIRCUIT OF 'SPLIT-PI' TOPOLOGY

POWER CONVERTER AND METHOD FOR POWER CONVERSION

The invention relates to a power converter and a method for power conversion for converting electrical power between first and second voltages, and in particular to a switched mode power converter and method.

1.0 SUMMARY OF THE INVENTION

The invention in its various aspects is defined in the appended independent claims, to which reference should now be made. Preferred or advantageous features of the invention are set out in dependent sub-claims.

The following text describes the invention, its principles of operation, its advantages over the known prior art, and, by way of example, various practical applications of the invention. The text refers to the drawings listed below, which include examples of circuits and illustrations of the control of these circuits. Unless specifically indicated to the contrary, these drawings are for reference to illustrate the general principles of the invention and should not be considered as delimiting the scope of the claims.

FIG. 1 shows the generic form of a first 'switched mode' power converter according to the invention;

FIG. 2 shows a simple derived generic form of the circuit of FIG. 1, where the filters are simply capacitors;

FIGS. 3 and 4 show outline practical circuits using MOSFETs and simple capacitor filters: (FIG. 3 has advantages for higher power practical circuits as N channel MOSFET devices are generally available in higher powers, and with lower 'On Resistance' than P channel devices. In FIG. 4 both N and P type transistors are used; this has the advantage of simplicity in the drive signal circuitry.);

FIGS. 5 and 5a to 5e show control signals for the circuit of FIG. 2 and illustrate current flows in the circuit under different load conditions;

FIG. 6 is a simplified version of a prior art circuit;

FIGS. 7 and 8a to 8b show control signals for the circuit of FIG. 3 and illustrate current flows in the circuit under different load conditions;

FIG. 9 shows a modified, negative polarity, version of the circuit of FIG. 4;

FIG. 11 shows a generic form of the circuit of FIG. 1, incorporating input and output filters.

Figure 10:
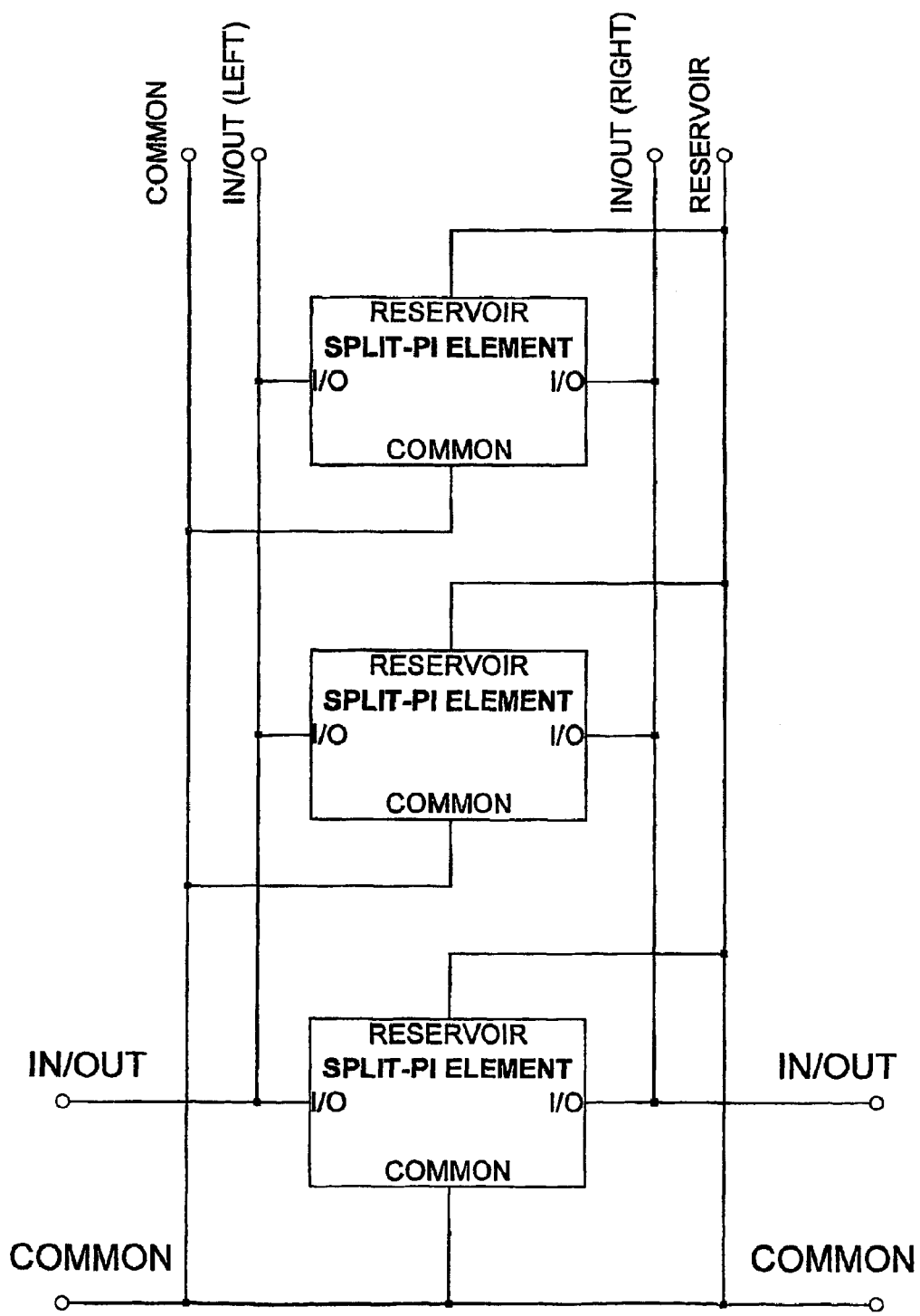
FIG. 10 shows a three-phase power converter incorporating three circuits based on that of FIG. 1.

The power converters in a preferred aspect of the invention are symmetric and bi-directional: the general characteristic of these converters is that they set a voltage ratio between the right and left side, and that power will flow in either direction through the converter determined by the characteristics of loads or electrical sources that are connected. The voltage ratio can be such that the voltage at one side is higher or lower than the other, independent of the direction or magnitude of current flow. There is a special case where both top switches (as shown in the drawings) are turned on, which will directly connect one side to the other with only small series resistive losses: clearly the voltage ratio is now 1:1 and power efficiency is very high.

Because of the lack of unavoidable voltage drops (such as semiconductor diode forward voltage drops) or any necessary dissipative elements, there are no intrinsic power losses, and subject to the constraints of practical design power efficiency may advantageously approach 100%.

The design is particularly suitable for use in multi-phase systems, where a large reduction in component size and cost can be realised. This design topology is unique in many ways: in multi-phase designs it is distinguished in having four terminals that can be connected in parallel.

These characteristics make the design particularly suitable for electric vehicle controllers, standing between a rechargeable battery and a drive motor. The motor and battery voltage characteristics can be chosen to match at the cruise speed: in the special case of direct connection efficiency is particularly high, but efficiency is also high at speeds around the cruise speed, and motor speed can be controlled from zero to any desired upper speed (which can in principle be a speed proportional to any multiple of the supply voltage).

In this document, operation is largely described in terms of the electric vehicle application, but the invention has many other application areas, as would be readily appreciated by the person skilled in the art.

2.0 THEORY OF OPERATION

The four switches of the basic circuit in FIG. 1 can be closed in several combinations, and Table 1 below lists these. Some of these are fixed switching, in which the left and right hand sides are directly connected, or in which 'special' connections can be made to isolate a supply, or apply a short to a motor load (to provide a damping or 'parking' brake function.

TABLE 1

SUMMARY OF USEFUL SWITCH COMBINATIONS

| S4 | S3 | S2 | S1 | |
|---|---|---|---|---|
| OFF | OFF | OFF | OFF | All off, no current can flow anywhere |
| ON | ON | OFF | OFF | Motor (assumed on RHS) is 'parked' with a short across it |
| <SWITCHING> | | ON | OFF | 'Down conversion' RHS voltage < LHS voltage irrespective of direction of current flow |
| ON | OFF | ON | OFF | Short, LHS and RHS voltages equal |
| ON | OFF | <SWITCHING> | | 'Up conversion' RHS voltage > LHS voltage |

The main operation of the design is as a switched mode converter, where two switches are active, which is capable of transferring power in either direction between two different voltages. In practical applications one side is likely to be a power source, such as a rechargeable battery, the other side a load such as an electric motor. Following convention the description below places the battery on the left of the diagram (figure) and the motor on the right. It should be noted that a rechargeable battery can both be charged and discharged, and that a DC electric motor can generally act both as a motor and a dynamo, so that current flow might be in either direction, independent of the actual battery and motor voltages.

In a practical application it would normally be the requirement to take the motor from a state where there was no drive (when it might be 'parked' with a short across it), progressively to a working voltage, that might be varied, then back to zero. Such a smooth progression, with electrical currents and voltages and mechanical loads within the design limits allow a simple description, where these 'in-limit' characteristics are assumed. In a practical circuit it is also necessary to add protective control features, and these are described later.

The majority of conventional switched mode converters are either 'up-converters' or 'down-converters', and in most current can only flow in one direction, ie from source to load. This design is entirely symmetrical and it will be seen that current can flow in either direction. Given this it can be seen that 'down-conversion', where a source of higher voltage at a lower current is passed to a load at lower voltage and higher current, becomes 'up conversion' if the current flow is reversed. There is in fact only one 'active' mode of conversion.

In the example of an electric vehicle, the first mode that is required is to apply a small voltage to the motor. For this, as shown in FIG. 5, S2 is ON and S1 OFF, and S3 and S4 are driven with control signals with a variable mark to space ratio, with the characteristic that one switch is always ON, but that they are never ON together. (In practical circuits this condition is modified to suit the switching device, and it will be shown that MOSFETS are particularly suitable). Operation is as follows (by reference to FIG. 2):

With S2 turned on, capacitor C3 is at the battery voltage. When S4 is on current $I_2$ is driven through L2, and this current increases according to $$\frac{dI_2}{dt} = \frac{V_3 - V_2}{L_2} \qquad \text{EXP 1}$$

where;

$V_3$=Voltage on C3
$V_2$=Voltage on C2 (output voltage)
$I_2$=Current through L2.

It is assumed that C2 and C3 are sufficiently large that the voltages on them do not significantly vary during a cycle (but see below).

When S4 turns off and S3 turns on current is drawn from the ground rail to the load. The voltage across L2 is now reversed and the current now falls according to $$\frac{dI_2}{dt} = \frac{-V_2}{L_2} \qquad \text{EXP 2}$$

This is a simple synchronous down converter.

It can be seen that for a steady state (where the average current matches the steady state current in the load) the rise and fall of current over a cycle must be equal, and so the following equations can be derived, which show that the voltage ratio between input and output is simply determined by the ratio of times $t_3$, $t_4$ that S3 and S4 are switched on.

$$t_4 \frac{dI_2}{dt(S4ON)} + t_3 \frac{dI_2}{dt(S3ON)} = 0$$

$$t_4 \left(\frac{V_3 - V_2}{L_2}\right) - t_3 \frac{V_2}{L_2} = 0$$

$$t_4 V_3 - t_4 V_2 - t_3 V_2 = 0$$

$$t_4 V_3 = (t_3 + t_4) V_2$$

$$\frac{V_2}{V_3} = \frac{t_4}{t_3 + t_4} \qquad \text{EXP 3}$$

With no load connected the net current is zero, and the sawtooth waveform of FIG. 5a is produced. It can be seen that for each switch, in the first half of its ON period current is 'back' into its rail, with the second half producing current in the 'conventional' direction. Given the approximation of large capacitors, the magnitude (amplitude) of the sawtooth current waveform is determined solely by the value of L2, the voltages and the ON times. This current is usefully called the 'excitation current'.

If a load is applied then, in principle, the voltage set by the mark-to-space timing ratio of EXP 3 is set on C2, and current in the load will flow according to external conditions, ie the load impedance and Ohm's law. For a resistive load this will be a steady current, and it is simply super-imposed on the excitation current, producing the waveform of FIG. 5b or FIG. 5c. Note that there is no important relationship between the magnitude (amplitude) of the excitation current and the load current, so the situations of FIG. 5b, where there is still a period of 'negative current' (where the steady state current is less than the peak-to-peak measure of the excitation current), and of FIG. 5c, where the load current exceeds the excitation current, are both possible. These are matters of practical design. It is however perhaps worth noting that such systems can work advantageously when the excitation current is a small fraction of load current.

If however a current source is attached instead of a load, then current will flow from load to source, and the current waveforms of FIGS. 5d and 5e will result. Note that this happens as a result of a change of load or source characteristic, not from any explicit changeover in control function. The topology is inherently bi-directional, with the control signals determining a Left to Right voltage ratio, and external impedances and conditions determining the direction and magnitude of current flow.

Note that, as given by EXP 3, for low 'output' voltages S3 is ON for relatively longer periods than S4, and that as the control signal ratio is progressively altered to increase the output voltage, the S4 ON time relative to that of S3 progressively increases. As the output voltage approaches that of the supply S4 will be on for the majority of the time until it turns ON permanently and S3 turns OFF. This is the 'short' condition, in which the output and input are linked via L1, L2, S2 and S4. This is the condition which will give the highest efficiency because there are no switching losses.

However this design can do up conversion as well as down conversion, and may advantageously be able to set the output to any desired voltage above the supply. The transition to this mode starts from the 'short' condition, where both S2 and S4 are permanently turned on. In this up-conversion mode S4 stays permanently on, and S1 and S3 start to switch on a variable mark-to-space ratio.

As above, this mode is only the down-convert mode in reverse, so operation in terms of the current waveforms is as already described. The governing voltage equation is $$\frac{V_2}{V_1} = \frac{V_3}{V_1} = \frac{t_1 + t_2}{t_2} \qquad \text{EXP 4}$$

At voltages slightly above the supply, S1 is ON for a relatively short time. As its ON time increases, so does is the output voltage. When ON times for S1 and S2 become equal, then the output voltage is twice the supply. Note that whilst there is symmetry in all currents and voltages, the voltage ratio for 'up conversion' is the reciprocal of that for 'down-conversion' for equal mark to space ratio. Thus if the voltage applied to the load is lower than the supply then it is linearly related to the mark to space ratio, as it goes above the supply voltage it can in principle be any multiple of the supply. In practical designs the upper voltage is thus determined by the actual voltage ratings of the components.

2.1 Advantages Over Known Topologies

U.S. Pat. No. 5,734,258 (Esser) describes a switched-mode power converter circuit in which first and second switching devices are serially coupled across a first voltage source, third and fourth switching devices are serially coupled across a second voltage source, and an inductor is coupled between a junction of the first and second switching devices and a junction of the third and fourth switching devices. FIG. 6 is a simplified drawing of Esser's converter circuit, redrawn here with simple switches, and incorporating capacitors shunting the switching devices as in a preferred form of the circuit which Esser describes. Note that the switch numbering has been reversed left to right by comparison to FIG. 1 since this allows a direct comparison of operation.

The circuit of FIG. 6 has only one inductor and does not have an intermediate capacitor (such as C3 of FIG. 1), however operation in terms of the switching elements is similar in principle to that of the invention, in that if S3 and S4 switch intermittently with S2 ON and S1 OFF then the circuit is a down converter, and if S1 and S2 switch intermittently with S4 ON and S3 OFF then the system is an up converter. With the approximation that C1 and C2 are sufficiently large that voltage variations on them are insignificant, then voltages and currents in the circuit are similar to those shown in FIGS. 5 to 5e.

The topology of the invention, as in FIGS. 1 to 4, has significant advantages over the circuit of FIG. 6, is in the trade-off between total volume and cost of the passive components (the inductors and capacitors) to achieve a given level of performance. Whilst the circuit of the invention may require an extra capacitor and an extra inductor, it results, on a like for like comparison, in the use of smaller components (in value and thus in size), with a reduction in overall circuit cost and size.

This analysis includes two distinct sorts of advantages: those that are intrinsic to the topology and can be described both theoretically and practically, and those that arise in the particular and important class of applications in which this circuit is used to control power between a rechargeable battery and a regenerative load, as described elsewhere herein.

The intrinsic advantage is most easily described on a like for like basis. That is, comparing the two topologies working over the same voltage range (from 0V to a multiple of the supply voltage) at the same currents and with the same frequency and timings of the drive signals at each voltage. The advantage is most pronounced when the excitation current is a small fraction of the working current, which is a desirable ratio for many reasons.

Take the example of down conversion, when the ratio of excitation current (measured peak to peak) is 1/10 of the average operating current. Start the comparison by considering all capacitors to be of one value C, and all the inductors one value L.

Then in the circuit of FIG. 6 the voltage switching of S3 and S4, current in L1 and voltage fluctuation in C2 will be identical to those in (respectively) S3 and S4, L2 and C2 (of, say, FIG. 2). However in the circuit of FIG. 6, the current demand on C1 is either zero (S1 ON) or the load current (S2 ON). C1 must therefore be chosen to be sufficiently large that voltage fluctuations on C1 due to the switching current are no more than the value allowable for a particular application. By comparison, in the invention, this switching current is delivered by C3, and L1 and C1 now form a filter between the supply and the switching elements. In the invention voltage fluctuations on C1 will naturally be very much lower than on C2, since the C1 L1 filter is excited by the ripple on C3, whereas C2 L2 form a filter excited by a voltage signal switching between zero and the supply (this current in L2 is of course the 'excitation' current).

Exactly similar arguments apply when the 'up-converting' case is considered. In the circuit of FIG. 6 each of C1 and C2 has to be sufficiently large to meet a voltage ripple specification when the switches S1 (or S3) and S2 (or S4) that are immediately connected thereto are switching, and the current exciting the voltage fluctuation is switching between zero and the load (down convert) or supply (up convert) current.

By comparison, in the invention, the largest current fluctuation is the excitation current, being for the sake of this comparison one-tenth the size of the current fluctuation in FIG. 6. Note also that the excitation current here is a sawtooth, rather than the square-wave current in the circuit of FIG. 6: this gives a significant advantage due to the pulse shape, since it involves slower current changes.

Thus, to achieve the same ripple figures, C1 and C2 in the invention can advantageously be less than one-tenth the value of those in the circuit of FIG. 6.

Note an alternative way of framing this advantage is this. In the circuit of FIG. 6, both C1 and C2 have to be sufficiently large keep voltage ripple to the required level, and one of them may have to source (or sink) an abruptly switching (variable mark-to-space) current waveform. In the invention this function is performed by C3. Since C3 is not directly connected to either supply or load its voltage fluctuations can be greater, and so C3 (FIG. 2) can be less than C1 or C2 (FIG. 6). C1 and C2 (FIG. 2) can then be a tenth or so of the size necessary for the circuit of FIG. 6.

This comparison only considers C1 and C2. However in any switched mode design the voltage ripple is determined by the product of the L and C values. Thus if each of L1 and L2 in FIG. 2 were made half the value of L1 of FIG. 6 the total amount of inductance would now be the same, C1 and C2 would need to be doubled, and so the reduction in C1 and C2 would now be ⅕.

This argument now leaves C3 as an extra component. As shown above it sees the same total change in current as C1 or C2 in FIG. 6. However this capacitor is not connected directly to either supply or load, and it need not be subject to the same requirement to have a low ripple voltage. In a practical design it could be allowed to swing 10 or more times an allowable ripple voltage, and this would still be a small voltage compared to the supply. In the direct comparison where L1 and L2 are now half the value of L1 in the prior art circuit, C3 need have a value no greater than C1 and C2 (of this invention).

Thus, if for the sake of example, the inductors are now made equal between the two circuits (FIGS. 2 and 6), but the ratio of capacitor sizes is 2×C (FIG. 6) to 3×0.2C (this invention), and it can be seen that the capacitor requirement of this invention is about ⅓ compared to FIG. 6.

In the important class of applications where, for instance, this invention controls power between a rechargeable battery, and a regenerative load such as a motor, embodiments of the invention may also provide practical advantages as follows.

Most rechargeable battery technologies offer a very low output impedance, part of which is a large parallel capacitor. There is often very little point having a large value C1 in parallel with a battery supply. In both this circuit and, for example, the circuit of FIG. 6 it is often possible to dispense with most of C1, (leaving in place only relatively small high frequency decoupling capacitors). Whilst this is possible with both the invention and the circuit of FIG. 6, as shown above the current fluctuations that the battery would have to be able to withstand are a lot lower ($\frac{1}{10}$) with the invention.

However in the up convert mode with the circuit of FIG. 6 it is not possible to dispense with C2. Current into C2 from L1 is completely intermittent, and in the absence of C2 the voltage excursions would be massive. However with many sorts of loads, such as DC motors, a massive parallel coupled capacitor is no great advantage, and may indeed be a disadvantage (very large currents may flow as motor windings move through varying magnetic fields. Thus, whilst for the circuit of FIG. 6 a substantial value C2 is necessary, in the invention it may possible to do away with all or most of C2.

2.2 Practical Circuits Using MOSFETS

FIGS. 1 and 2 are generalised circuits. Using current technology, MOSFETs (Metal Oxide Semiconductor Field Effect Transistors) have a number of advantages which allow advantageous practical designs. They have some properties not shared by other sorts of semiconductor device suitable for controlling of these circuits in the manner described theoretically above.

A MOSFET can be crudely modelled as a semiconductor channel with conductivity controlled by the Gate-Source voltage, in parallel with an intrinsic diode. With the Gate-Source voltage applied and the channel switched on these devices conduct current equally well in either direction. With the Gate-Source voltage at zero the channel is turned off and conduction is determined by the diode, blocked in one direction but conducting in the other with a characteristic forward voltage.

The switching diagram of FIG. 5 assumes a pair of switches respectively switching ON and OFF simultaneously and instantaneously. With practical devices this cannot be achieved. However in a preferred embodiment of the invention the useful properties of MOSFETS in this topology allow highly controlled switching which achieves efficiency that can approach 100% (ie there are no intrinsic power losses that cannot be reduced). There are also some other advantages as described below.

In the discussion that follows the expressions 'conventional' and 'anti-conventional' current are used. 'Conventional current' is in the direction normally for a MOSFET, ie from Drain to Source for an N-channel device, the direction that the intrinsic diode would block. 'Anti-conventional' is in the same direction as current can flow in the intrinsic diode, but when indicated, this is in the conduction channel, not through the diode. In the applications described here it is assumed that 'anti-conventional' current flowing through the conduction channel, with the MOSFET turned on, is at a sufficiently low level that the voltage generated across the resistance of the conduction channel is lower than would be needed to bias the intrinsic diode into conduction. In this sense it can be said that the switched on MOSFET channel is shorting out the intrinsic diode.

With any switching pair such as S1 and S2, there are two important considerations;

a__That there should be no time when both switches are turned ON. If this were to occur a very high shorting current would flow straight from the intermediate (C3) capacitor to ground. If this happens for any sustained time it is likely that the current would exceed the device rating and the MOSFETS would be destroyed. If it happens for very short periods in the cross-over period, and the currents are such that they can be tolerated by the switching devices, then this 'cross-over' current represents a straightforward loss of energy, and appears as inefficiency.

b__That devices should switch between the ON and the OFF states as rapidly as possible. In any intermediate state any current that flows is doing so through a switch channel that does not have its characteristic minimum resistance, and again this results in power loss to the system by thermal dissipation in the switching devices. Condition b. above is common to all switching systems and in a practical design is advantageously achieved by driving the Gate with a driver with a sufficiently low impedance to achieve the desired switching times. However, in the topology of this invention, it will be seen that the direction of flow of the current being switched is important, and the following discussion illustrates the considerations.

Using MOSFETS in this circuit (or other semiconductor devices with similar properties) provides a particularly easy solution to the cross-over problem described in a. above. Both conditions are met if the drive signals are designed so as to have a short but definite delay between one switch being turned off and the other being turned on. These delays should be sufficiently long to ensure condition a. is met under all possible conditions and component tolerances, but otherwise as short as possible.

FIG. 7 shows the Gate drive signals that meet this condition, with the delay exaggerated. Note that these Gate signals are shown with a sense of a more positive signal causing the MOSFET to be turned on, and this would directly suit a circuit such as FIG. 3 which is implemented all in N channel MOSFETS.

Consider the case of down conversion with S2 permanently ON, S1 OFF and S3 and S4 switching alternately, and initially the case of no load. The current waveform is then as in FIG. 7a. Each ON cycle starts with the excitation current flowing in the opposite direction to that considered conventional for a MOSFET. Whilst each MOSFET is turned ON this current flows in the conduction channel, and (as a matter of design to avoid power loss) the IR voltage developed across the diode will not be sufficient to turn it ON. Each MOSFET is switched OFF before the other in the pair is switched ON, and, as described above, current is now flowing in the conventional sense. Switch-off is of course not instantaneous, and the resistance of the conduction channel rises as the Gate charge is removed.

When not either switched hard ON or hard OFF, MOSFETS are properly and more accurately described as transconductance devices, ie the applied Gate-Source voltage fairly directly controls the Drain-Source current, which is largely independent of Drain-Source voltage. The current in the device is, however, controlled by the inductor, and in this application the current in the inductor will not change significantly during the switching times of the MOSFETS. Thus when the Gate-Source voltage has decreased to the point that the corresponding conductance is less than that required to support the current 'I' then the Drain-Source voltage will start to increase rapidly. Because the current is flowing in the 'conventional' sense, the voltage developed is in the 'blocking' direction of the intrinsic diode, and so this does not conduct. The voltage at point A (or B) of FIG. 1 moves towards the opposite rail. The rate of change of voltage is determined by the current excess (ie inductor current minus conductance in the device switching off) charging the capacitance at the junction A (or B) of FIG. 1. Since the 'current excess' is a substantial and increasing proportion of the operating current, and the capacitance to ground of the junction (A or B) will be low, the rate of change of voltage at A (or B) will be substantial, and it will very quickly swing to the opposite rail voltage.

If for instance it was S3 that was switching off, then the voltage at B would rise to the voltage on C3.

Now because there are delays built into the Gate drive signals, S4 is not turned on at this time. The voltage at B therefore rises above that of C3 until it is sufficient to turn on the intrinsic diode of S4. Conduction current now transfers from S3 to the intrinsic diode as the conductance of S3 falls (note that at this point the Drain voltage of S3 is clamped, and so the effect of the parasitic Drain Gate 'reverse transfer' capacitance ceases, speeding up voltage changes on the Gate). A small time later S4 will switch ON, but when it switches on fully it will simply short out its own intrinsic diode, and the ON voltage across S4 will reduce to that is determined by its own ON channel resistance and the current flowing.

The above analysis is correct when the design aims at maximum power efficiency and the assumes that the maximum voltage developed across a MOSFET when switched on and when current is flowing in the 'anti-conventional' sense is less than its intrinsic diode forward switch on voltage.

Under these circumstances it can now be understood that the conditions of switching can be controlled to be advantageous for high power efficiency. Power losses associated with S3 switching have a peak value of the working voltage multiplied by a significant proportion of the switching current, (this is the characteristic of most semiconductor switching), but in this transition the action of the inductor is to aid the switching transition and thus ensures that the dissipation time is minimised.

The switch ON of S4 does not have a similar dissipation. The maximum switching dissipation is simply the working current times the forward voltage of the intrinsic diode, and the switching time is very short because the time to change the drain voltage is very short. Note in particular that whilst there is an unavoidable power loss whilst the intrinsic diode is conducting due to its forward voltage characteristic, the time during which it conducts can be reduced by control of switching timing, so that its contribution to overall inefficiency can be made arbitrarily small.

FIG. 8a shows this switching transition in some detail.

In the no-load case both transitions have this characteristic, and the skilled person would appreciate is that this is the case both for down conversion and up conversion.

Now consider the case, again of down conversion, where the steady load current is greater than the peak-to-peak excitation current. In this case S4 always conducts in the conventional direction, and S3 always in the 'anti-conventional'. It is clear that the transition S4 OFF S3 ON is the same as for the 'no-load' case.

For the transition S3 OFF S4 ON the situation is different. The current sense is 'anti-conventional'. When S3 turns OFF the voltage across S3 now changes just enough for its intrinsic diode to start conducting, and the voltage at point B of FIG. 1 will not change significantly.

S4 will now turn on a small time later. It will start to supply current to the junction, point B, as soon as it turns on, but the voltage at point B will not begin to change until S4 is supplying all the current and the intrinsic diode of S3 is biased OFF. In power dissipation terms this is a worst case transition since the peak dissipation is the full current times the full working voltage. The sense of current flow in the inductor does not assist the voltage swing at point B. The short period of conduction of the intrinsic diode of S3 produces a small step voltage 10 in the waveform, as shown in detail in FIG. 8b. As with the case above the power loss associated with this diode conduction can be minimised by minimising its duration.

Consideration of the case of up conversion with a real load (where the load current exceeds the peak to peak excitation current) will show that now all conduction in S1 is in the conventional sense, and all that in S2 in the 'anti-conventional' sense. Hence, when S1 switches off there is a rapid voltage transition at point A, assisted by the direction of current flow in the inductor, followed by a short period in which the intrinsic diode of S2 is switched ON, itself followed by conduction through the MOSFET channel as S2 turns ON. However when S2 turns OFF conduction switches to its own intrinsic diode, followed by the full turn ON of S1.

Thus it can be seen that a simple rule is established, based on the operating waveforms shown in FIGS. 7 and 8. When current in a device is in the 'conventional' direction and it is time for it to switch OFF, then the direction of current in the inductor is such as to assist a rapid voltage swing, followed by a short period of conduction of the intrinsic diode of the other switch. When conduction in a device is in the 'anti-conventional' direction, then switch off results in a short period of conduction of its own intrinsic diode, followed by a normal voltage transition driven by the other device switching ON.

For completeness it is only necessary to outline the situation of regeneration, where current flow is in the reverse direction to that of the examples above. This of course is covered by the earlier observation that regeneration in a down conversion is identical to 'conventional' up conversion (and that in up conversion is simply conventional down conversion). The nature of the switching transitions in any case are therefore easy to determine from the considerations outlined above.

3.0 OTHER FEATURES OF THE INVENTION

The sections above outline the basic invention, and its important implementation using MOSFET switches. The following sections outline variations and features.

3.1 Note on Use of Types of MOSFET

FIGS. 3 and 4 show two particularly useful circuits. It is possible, as noted below, to make negative polarity circuits by simply changing notation, and it would be possible to make circuits using all P channel devices (but not usually preferred due to their generally inferior performance).

There are however a few differences of operation that are instructive between circuits using all switches of one type, and those using both types, and all of these considerations can be derived by consideration of the circuits of FIGS. 3 and 4.

Firstly, as noted elsewhere, the circuit of FIG. 1 and derivatives can only work with the same input and output polarities, and MOSFETS can only make that sub-class of circuits where that polarity is fixed. It is necessary for circuit operation that when all the MOSFETS are switched OFF then no current should flow, and this requires that under that condition all the intrinsic diodes should be biased OFF.

In general, N type MOSFETS are superior to P types, offering lower ON resistance than P types on a cost for cost or size for size basis. They also tend to offer better dynamic performance, with a lower ON resistance for a given level of Gate charge. The circuit of FIG. 3 is therefore generally to be preferred where high powers are needed.

However to implement FIG. 3 the drive circuitry to the upper MOSFETS is more complex than in the circuit of FIG. 4. At lower powers, where P channel MOSFETS of adequate performance are available, then the circuit of FIG. 4 may have advantages.

3.2 Regeneration

In a common practical example, if (as drawn in the figures) the left hand side of a circuit is connected to a rechargeable battery and the right hand side to a DC electric motor, then the control signals to the converter can be such as to cause the motor to be driven at a variable voltage (and thus variable speed). Whilst the motor represents a load, power will flow from the battery to the motor, and thus to any mechanical load. If, however, the motor load has inertia, such as would be provided by a flywheel, then when the control signals are set to slow the motor, the motor will act as a dynamo. Mechanical energy stored in the flywheel will be converted to electrical energy and flow from right to left, recharging the battery. Similarly, if the motor is used to drive an electric road vehicle, then the vehicle's speed can be controlled as it goes down a hill, again recharging the battery by dynamo action of the motor. These converters can thus be classed as 'regenerative', and the regenerative action requires no 'changeover' switching between driving and regeneration.

3.3 Variable Voltage Sources

Whilst drive of DC electric motors is a prime application, there are many others. Because of the regenerative action, if one side (conventionally, but not for any fundamental reason, shown as the left hand side) is connected to a 'voltage source' (something with the capacity to both source and sink electrical current whilst maintaining an essentially constant voltage, typically a rechargeable battery), then the right hand side also has the characteristic of a 'voltage source', where the voltage to be maintained is set in ratio to the fixed voltage by the control signals, and any tendency of the right hand side voltage to vary from that set will cause current to flow in a direction so as to correct the change). The control signals can then be set so as to produce arbitrary voltage waveforms. If the load driven by these waveforms has any storage characteristics then the drive will be highly efficient: stored energy will be returned to the left hand side storage when the change in output voltage is such as to require this. These converters can thus be used as variable voltage sources, which have an enormous range of uses. In many these will replace conventional 'Power Amplifiers', offering the advantages of efficiency and energy regeneration.

3.4 Polarity

The practical MOSFET circuits of FIGS. 3 and 4 can only work with a DC supply with 'positive' polarity with respect to 'Ground' or 'Common'. However changing the notation (as explicitly shown in FIG. 9, which is FIG. 4 redrawn with minor changes) shows how 'negative' supply converters can be constructed. However this single polarity limitation results from the characteristics of the MOSFET switches, not from the topology of FIG. 1 itself. With switches that can work with both polarities, both sides of the converter might in principle be connected to an AC circuit. The input and output would then have to be AC with the same frequency, with zero-crossings at approximately the same time, but with AC signals that were of a low frequency by comparison to the converter switching frequency, the waveforms on either side could be independent.

3.5 Multi-phase Converters

As with other DC-DC converters, there are advantages that can be gained by sharing storage capacitors (C1, C2, C3 of FIGS. 1–4) with multiple switching elements running in a multi-phase drive. If there are N separate phases then in general the total capacitance at each position in the topology reduces by a factor N squared, compared to use of a single phase of the same total power. In this factor 'N squared', one factor N comes from the fact that N capacitors now share the load, and the other factor of N comes because the time between reversals of current is now divided by N.

This ability to share in multiphase systems is common to several topologies, however the 'Split-pi' topology of this invention is distinguished from the other topologies in that it has four terminals that have to be parallel connected across the phases;

IN/OUT (Left)
IN/OUT (Right)
Common (Ground)
Reservoir

These terminals are shown schematically in FIGS. 1 to 4.

FIG. 10 shows an outline of a three phase 'Split-pi' converter, where the individual elements can have any of the forms deriving from the generic form of FIG. 1.

3.6 Variants on the Basic Topology

The basic design can have many variants, in all of which the essential elements derive directly from FIG. 1. The most important variations are of the filters beyond L1 and L2 to suit particular applications. As an example, in the case of a rechargeable battery powering an electric motor through this circuit, capacitors C1 and C2 might be dispensed with altogether, or very much reduced in value. A rechargeable battery typically has a very large internal capacitance of its own, and presents a low source impedance to the converter. If this is considered to be on the left of the diagram then the capacitor C1 might be reduced in value, sufficient only to suppress high frequency voltages that might be generated by current changes acting on the impedance of the cables connecting to the battery. A DC electric motor primarily has the characteristics of a 'voltage source' (or 'voltage sink' when the motor is running conventionally) since its mechanical rotational inertia maintains a 'back-emf' that can only change slowly. C2 would again be chosen to be sufficient to suppress high frequency spikes, however supply from a primarily inductive source (ie L2 with only a low value for C2) is normally not a disadvantage, and may be an advantage in that it may reduce high frequency mechanical stresses that will occur when windings fed from a very tightly controlled voltage encounter the necessarily varying magnetic field across the width of a pole.

At the opposite end of the spectrum the filters might take the form of FIG. 11 where additional filter 'poles' are added. Here the intention is to keep the voltage 'ripple' at input and output minimised. As with all electrical filters a lower overall volume or cost of inductors and capacitors can produce a greater level of smoothing, if they are split into two or more sections. Thus, referring to FIG. 11, if C1, C4, L1, L3 are all half the value they would be in a comparable single stage filter, then the voltage excursion at point C would be four times that in the single stage, but that at D will be very much lower, by the same ratio.

What is claimed is:

1. A power converter for controlling power flow between first and second voltages, the power converter comprising:
   a common connection between a first polarity of the first and second voltages;
   a capacitance coupled at a first electrode to the common connection and having a second electrode;

first and second switches, linked at a connection which when switched on conduct current bi-directionally and when switched off operate like a semiconductor diode, connected in series between the common connection and the second electrode of the capacitance;

third and fourth switches, linked at a connection which when switched on conduct current bi-directionally and when switched off operate like a semiconductor diode, connected in series between the common connection and the second electrode of the capacitance;

a first inductance coupled between a second polarity of the first voltage and the connection linking the first and second switches;

a second inductance coupled between the second polarity of the second voltage and the connection linking the third and fourth switches; and a controller, controlling operation of the switches to control power flow between the first and second voltages;

in which the converter has a first mode of operation when the controller causes the first switch to be open, the second switch to be closed, and the third and fourth switches to switch alternately, the second voltage being less than the first voltage, a second mode of operation when the controller causes the first and second switches to switch alternately, the third switch to be closed and the fourth switch to be open, the second voltage being greater than the first voltage, and a third mode of operation when the controller causes the second and fourth switches to be closed, and the first and third switches to be open, the first and second voltages being equal.

2. A power converter according to claim 1, in which alternately switching the first and second switches or the third and fourth switches determines a ratio between the first voltage and the second voltage.

3. A power converter according to claim 1, in which power can be transferred in either direction, from the first voltage to the second voltage or from the second voltage to the first voltage.

4. A power converter according to claim 1, which is substantially symmetrical between the first and second voltages.

5. A power converter according to claim 1, comprising a filter coupled between the first and second polarities of the first voltage.

6. A power converter according to claim 1, which is configured to allow operation as a power supply, or in a regenerative mode, without varying the controller's operation of the switches.

7. A power converter according to claim 1, in which one or more of the switches comprises a MOSFET.

8. A power converter according to claim 1, in which the controller controls alternately switching a pair of switches, which is one of the first and second switches, or the third and fourth switches, with an intervening delay during which both of the pair of switches is switched oft and current is temporarily carried by an intrinsic diode portion of the MOSFET.

9. A converter as in claim 1, further comprising a variable voltage supply.

10. A converter as in claim 1, further comprising a electrically-powered vehicle.

11. A voltage converter couplable between first and second voltages, comprising;

a common connection between a first polarity of the first and second voltages;

a capacitance coupled at a first electrode to the common connection;

first and second switches, which when switched on conduct current bi-directionally and when switched off behave like a semiconductor diode, connected in series between the common connection and the second electrode of the capacitance;

third and fourth switches, which when switched on conduct current bi-directionally and when switched off behave like a semiconductor diode, connected in series between the common connection and the second electrode of the capacitance;

a first inductance coupled between the second polarity of the first voltage and the connection linking the first and second switches;

a second inductance coupled between the second polarity of the second voltage and the connection linking the third and fourth switches; and a controller for controlling operation of the switches to control a ratio between the first and second voltages;

in which the converter has a first mode of operation when the controller causes the first switch to be open, the second switch to be closed, and the third and fourth switches to switch alternately, the second voltages being less than the first voltage, a second mode of operation when the controller causes the first and second switches to switch alternately, the third switch to be closed and the fourth switch to be open, the second voltage being greater than the first voltage, and a third mode of operation when the controller causes the second and fourth switches to be closed and the first and third switches to be open, the first and second voltages being equal.

* * * * *

UNITED STATES PATENT AND TRADEMARK OFFICE
CERTIFICATE OF CORRECTION

PATENT NO.       : 6,914,420 B2                                             Page 1 of 1
APPLICATION NO.  : 10/480060
DATED            : July 5, 2005
INVENTOR(S)      : Timothy Richard Crocker It is certified that error appears in the above-identified patent and that said Letters Patent is hereby corrected as shown below:

In the drawings, Sheet 6, FIG. 6, please delete the middle line segment located at the top of the diagram as shown below:

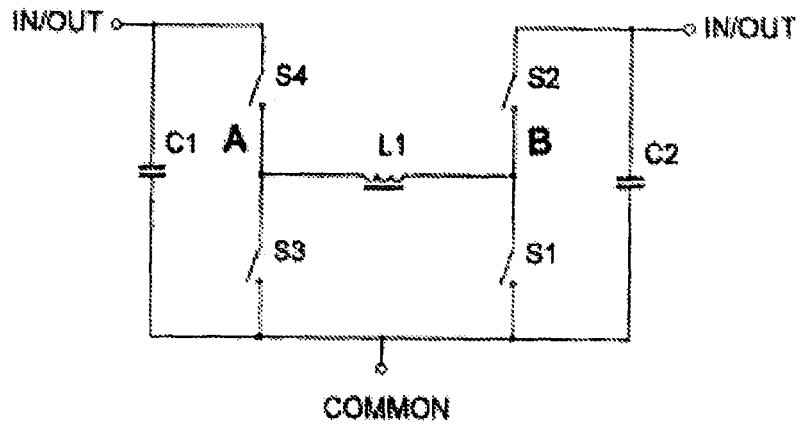

FIG 6   NEAREST KNOWN PRIOR TOPOLOGY AFTER 'ESSER'

Signed and Sealed this

Eleventh Day of May, 2010

David J. Kappos
*Director of the United States Patent and Trademark Office*